United States Patent
Chiang et al.

(10) Patent No.: US 9,579,579 B2
(45) Date of Patent: Feb. 28, 2017

(54) PNEUMATIC DRIVEN TWO-AXIS MOTION PLATFORM

(71) Applicant: INJOY MOTION CORP., New Taipei (TW)

(72) Inventors: Johnson Chiang, New Taipei (TW); Ping-Lin Wu, New Taipei (TW); Song-Kuei Chang, New Taipei (TW)

(73) Assignee: INJOY MOTION CORP., New Taipei (TW)

( * ) Notice: Subject to any disclaimer, the term of this patent is extended or adjusted under 35 U.S.C. 154(b) by 0 days.

(21) Appl. No.: 15/098,515

(22) Filed: Apr. 14, 2016

(65) Prior Publication Data

US 2016/0310853 A1 Oct. 27, 2016

(30) Foreign Application Priority Data

Apr. 24, 2015 (TW) .............................. 104206335 U (51) Int. Cl.
*A63G 31/16* (2006.01)
*A47C 1/12* (2006.01)

(52) U.S. Cl.
CPC .................................. *A63G 31/16* (2013.01)

(58) Field of Classification Search
CPC ........ A63G 31/00; A63G 31/12; A63G 31/16; A47C 1/00; A47C 1/12; A47C 3/02; A47C 7/002; A47C 15/004; A63J 5/00; A63J 25/00; A63J 2005/002

USPC .......... 472/59, 60, 61, 130, 134; 297/344.1, 297/344.11, 344.12, 217.1, 217.3, 463.1
See application file for complete search history.

(56) References Cited

U.S. PATENT DOCUMENTS

| | | | | |
|---|---|---|---|---|
| 7,094,157 | B2 * | 8/2006 | Fromyer | A63G 31/12 434/55 |
| 8,287,394 | B2 * | 10/2012 | Gil | A47C 1/12 434/55 |
| 8,888,185 | B2 * | 11/2014 | Liao | A47C 1/12 248/346.03 |
| 2002/0164560 | A1 * | 11/2002 | Borta | G09B 9/08 434/55 |
| 2009/0282941 | A1 * | 11/2009 | Chang | A63G 31/16 74/470 |

* cited by examiner

*Primary Examiner* — Kien Nguyen
(74) *Attorney, Agent, or Firm* — Bacon & Thomas, PLLC (57) ABSTRACT

A pneumatic driven two-axis motion platform is structurally simple for using two bag-shaped telescopic modules spaced apart and fixed to a foundation base being laid on the ground, and a movable table having a pivotal shaft used for making a pivotal connection with a two-way orthogonal rotator, after completely assembled, the movable table is mounted on the two bag-shaped telescopic modules by such arrangement that the two bag-shaped telescopic modules are symmetrical against the pivotal shaft of the movable table, and the two-way orthogonal rotator is arranged together with the two bag-shaped telescopic modules as an isosceles triangle arrangement; by such structural arrangement, said two-axis motion platform is endowed with two dimensions of rotational freedom when pneumatic inflating or deflating one or both of the two bag-shaped telescopic modules.

9 Claims, 9 Drawing Sheets

PNEUMATIC DRIVEN TWO-AXIS MOTION PLATFORM

BACKGROUND OF THE INVENTION

1. Field of the Present Invention

The present invention relates to a pneumatic motion platform, and more particularly to a pneumatic driven two-axis motion platform which uses as few as two sets of bag-shaped telescopic modules.

2. Description of Related Art

Traditional two-axis dynamic simulation devices, such as 3D dynamic simulation devices for use in simulation of aviation or car racing, usually either adopt hydraulic technology or use one or more driving motors to hydraulically or mechanically drive the two-axis dynamic simulation device to be moved in one-axis motion or in two-axis motion along two axes at the same time.

However, the two-axis dynamic simulation devices using hydraulic technology have disadvantages regarding bulky volume, numerous parts required, difficult for assembling works, and inconvenient for frequent maintenance.

On the other hand, the two-axis dynamic simulation devices using one or more driving motors are difficult for assembling works due to too many components. Hence, for purpose of saving costs and improving efficiency in maintenance, the pneumatic technology has been introduced into two-axis dynamic simulation devices.

Figure 1:
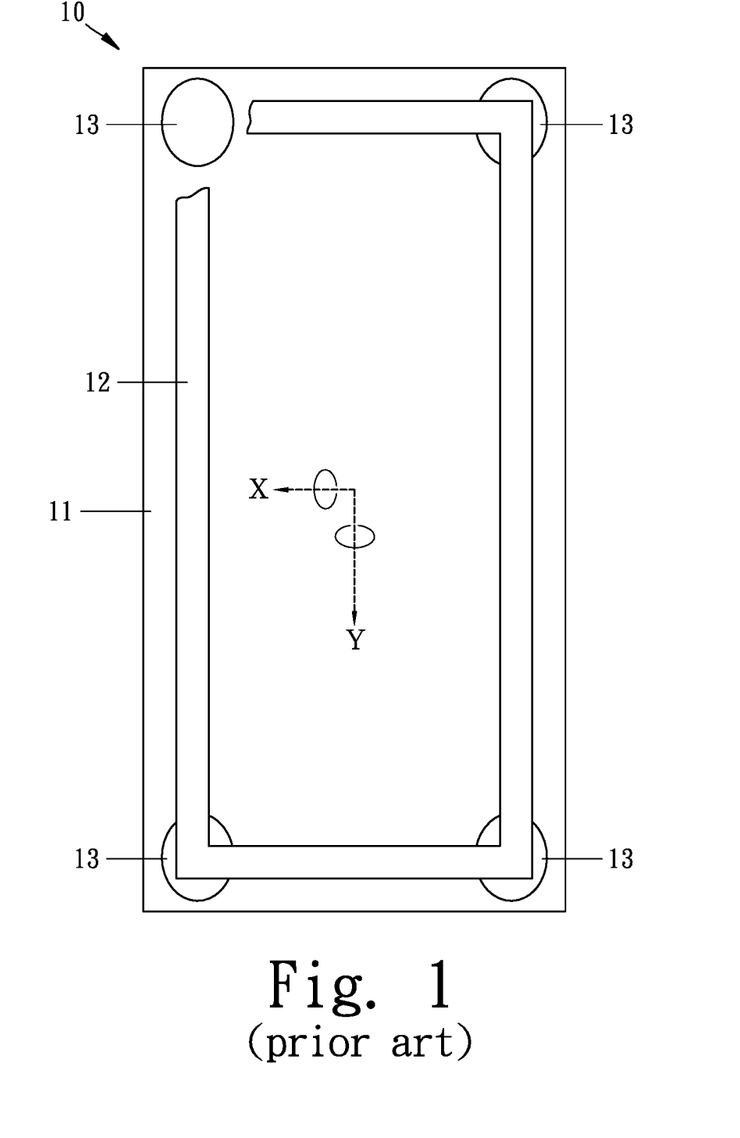
FIG. 1 is a schematic drawing of a prior known pneumatic driven gasbag-type motion platform.
Figure 2:
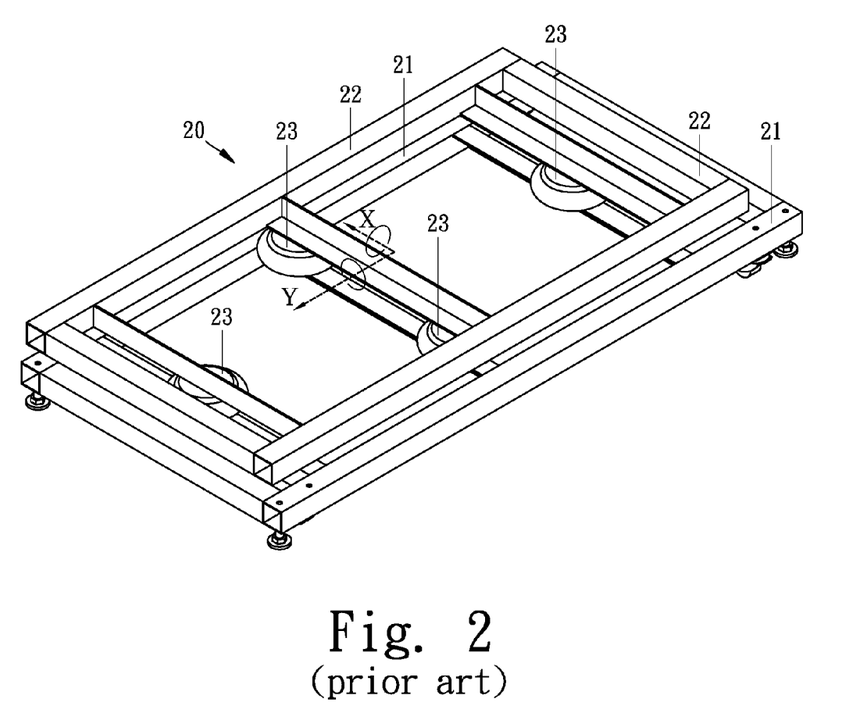
FIG. 2 is a schematic drawing of another prior known pneumatic driven gasbag-type motion platform.

With reference to FIG. 1 or FIG. 2, there are two alternatives regarding pneumatic motion platforms, one prior known pneumatic driven gasbag-type motion platform 10 has shown in FIG. 1, and alternatively, another prior known pneumatic driven gasbag-type motion platform 20 has shown in FIG. 2. Both respectively have to use four sets of bag-shaped telescopic modules 13 (or 23), and each set of bag-shaped telescopic module 13 (or 23) is become expandable as well as contractible when driven through pneumatic operation.

In operation, the bag-shaped telescopic modules 13 (or 23) is allowed to be expandable when driven by compressed gases for air inflation, or, allowed to be contractible when expelled gases out from the gas bag module 13 (or 23) for air deflation, but otherwise, is permanently kept in a stationary shape when stopped for air inflation or air deflation.

The pneumatic driven gasbag-type motion platform 10 as depicted in FIG. 1 comprises a foundation base 11, a movable frame 12, and four sets of bag-shaped telescopic modules 13 via such a way each being respectively located at one of four corners between the foundation base 11 and the movable frame 12. Such an arrangement, however, may cause a hindrance or obstruction in doing two-axis dynamic motion among the four bag-shaped telescopic modules 13.

On the contrary, only when the two bag-shaped telescopic modules 13 arranged as being adjacent each other are inflated or deflated simultaneously, the movable frame 12 of the pneumatic driven gasbag-type motion platform 10 will be therefore driven to perform one-axis rotation that has one dimensional freedom either in the X-axis direction or in the Y-axis direction as shown in FIG. 1. Nevertheless, the pneumatic driven gasbag-type motion platform 10 is impossible to generate a two-axis rotation that has two dimensions of freedom about X-axis or/and Y-axis directions, thus inevitably to cause the application scope of the pneumatic driven gasbag-type motion platform 10 being limited.

To solve the above-mentioned problem regarding impediment and interference among the four sets of bag-shaped telescopic modules 13 as shown in FIG. 1, another pneumatic driven gasbag-type motion platform 20 is invented as shown in FIG. 2 to comprise a foundation base 21, a movable frame 22 and four sets of bag-shaped telescopic modules 23 via such a way each being arranged as an orthogonal arrangement when installed between the foundation base 21 and the movable frame 22.

Such an arrangement allows one or more sets of the four sets of bag-shaped telescopic modules 23 of the gasbag-type motion platform 20 to be controlled individually or together without any impediment or interference happened on any sets of the gas bag modules 23. As a result, the movable frame 22 of the pneumatic driven gasbag-type motion platform 20 is enabled to perform not only one-axis rotation that has one dimension of freedom about either X-axis or Y-axis direction as shown in FIG. 2, but also two-axis rotation that has two dimensions of freedom about X-axis or/and Y-axis directions.

However, in consideration of both cost-benefit and maintenance-benefit, the pneumatic driven gasbag-type motion platform 20 of FIG. 2 due to indispensably using four sets of bag-shaped telescopic modules 23 has unavoidable defects in high manufacturing cost and high maintenance fee.

SUMMARY OF THE INVENTION

Therefore, the present invention has been made in view of the above problems, and it is an object of the present invention to provide a first pneumatic driven two-axis motion platform being structurally designed to only have two sets of bag-shaped telescopic modules and having advantage of not only manufacturing costs more effectively reduced but also overall structures more simply assembled and maintained; so that the first pneumatic driven two-axis motion platform comprises a foundation base to be laid on the ground, a movable table having a pivotal shaft, two sets of bag-shaped telescopic modules spaced apart each other and fixed to the foundation base as well as combined with the movable table through such an arrangement that they are symmetrical against the pivotal shaft of the movable table; and a two-way orthogonal rotator fastened on the foundation base as well as pivotally connected with the pivotal shaft of the movable table.

It is another object of the present invention to provide a first pneumatic driven two-axis motion platform to allow the two sets of bag-shaped telescopic modules and the two-way orthogonal rotator are such arranged together as an isosceles triangle arrangement fixed to the foundation base, resulted in that the two sets of bag-shaped telescopic modules are symmetrical against the pivotal shaft of the movable table, and also the movable table is endowed with two dimensions of rotational freedom when pneumatic inflating or deflating one or both of the two sets of bag-shaped telescopic modules.

Instead of containing two sets of bag-shaped telescopic modules installed in the first pneumatic driven two-axis motion platform, it is a yet another object of the present invention to provide a second pneumatic driven two-axis motion platform, which contains two sets of pneumatic cylinders or barometric shock absorbers having similar operating function like the bag-shaped telescopic modules mentioned above.

In accordance with yet another aspect of the present invention, a further improvement of the pneumatic driven two-axis motion platform is that the two-way orthogonal rotator is replaced by a universal joint or a ball joint that is functionally similar thereto.

Another improvement of the pneumatic driven two-axis motion platform of the present invention is that an adjustable foot used for adjusting either the level or the height of the foundation base is provided at each of four bottom corners of the foundation base.

A further another improvement of the pneumatic driven two-axis motion platform is that a seat or a cockpit is mounted on the movable table.

As compared to the prior-art device, the disclosed pneumatic driven two-axis motion platform benefits by simpler structure, fewer components, easier assembly, more convenient maintenance and significantly reduced manufacturing cost, and is more suitable for light-duty applications.

The disclosed pneumatic driven two-axis motion platform provides the following beneficial effects:
1. It features simpler structure and fewer components as compared to the prior-art device, so is easy to assemble and maintain;
2. It uses two sets of bag-shaped telescopic modules instead of four sets used in the state of art, so can significantly reduce manufacturing cost; and
3. It is particularly useful for light-duty applications.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, preferred embodiments of the present invention will be described in detail with reference to the annexed drawings.

As shown in from FIG. 3 to FIG. 5, a first embodiment of a pneumatic driven two-axis motion platform (hereinafter abbreviated as two-axis motion platform) 30 of the present invention is disclosed to use two sets of bag-shaped telescopic modules 33 and 34, compared with the prior known pneumatic driven gasbag-type motion platform 10 (or 20) of FIG. 1 (or FIG. 2) which is taught to use four sets of bag-shaped telescopic modules 13 (or 23).

Figure 3:
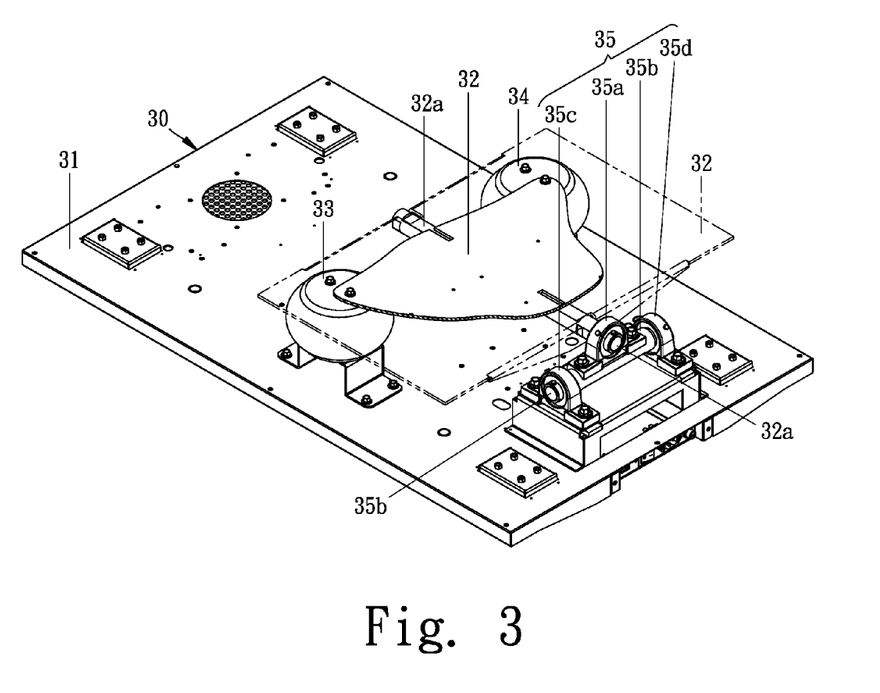
FIG. 3 is a schematic drawing of a pneumatic driven two-axis motion platform according to the present invention.
Figure 4:
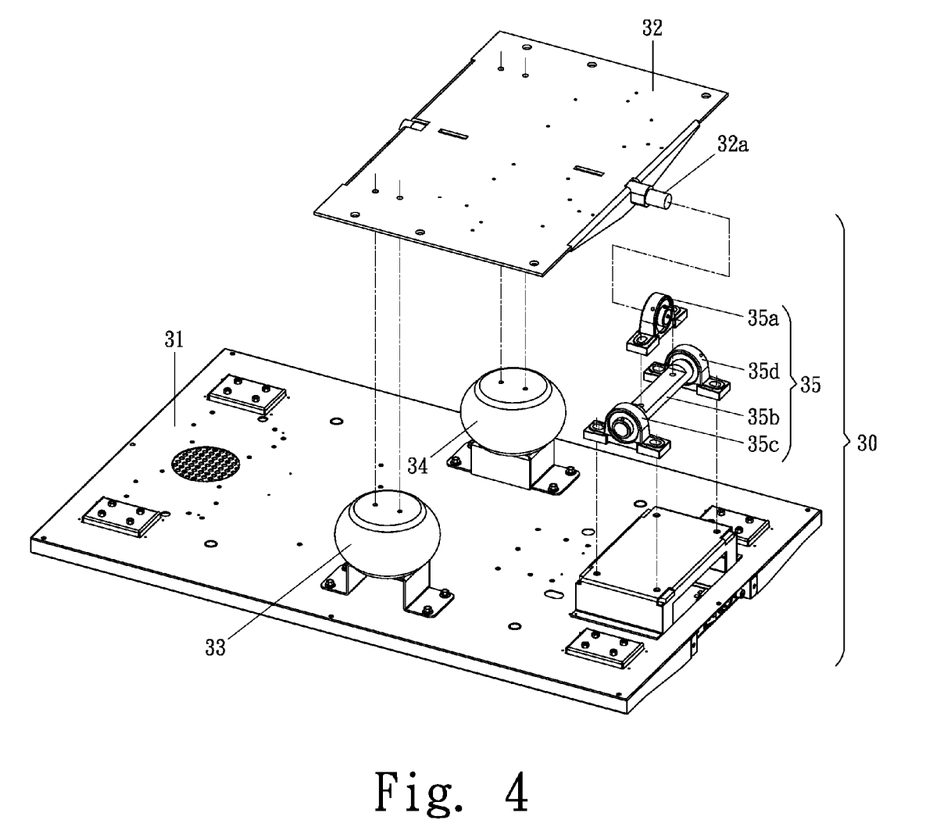
FIG. 4 is an exploded view of the pneumatic driven two-axis motion platform of FIG. 3.
Figure 5:
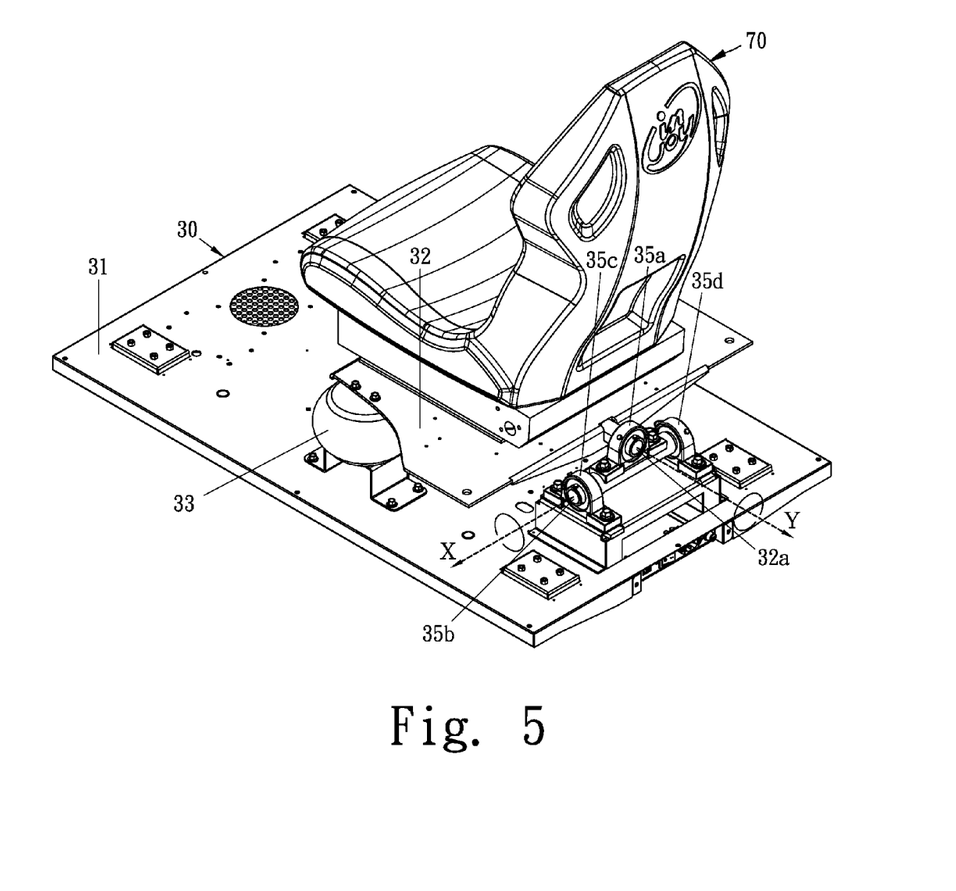
FIG. 5 is an assembly drawing to illustrate that a seat is mounted on the pneumatic driven two-axis motion platform of FIG. 3 to jointly form a 3-dimensional (3D) game console.
Figure 6:
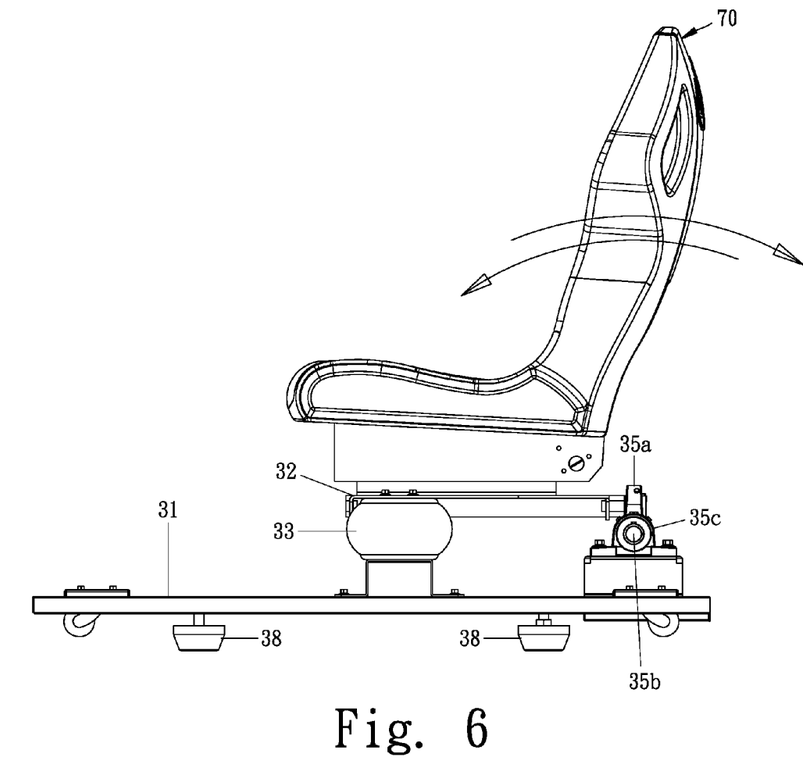
FIG. 6 is an illustration drawing to show the 3D game console of FIG. 5 via the pneumatic driven two-axis motion platform of the present invention to control the seat due to being tilted forward and backward about the X-axis (as shown in FIG. 5) is able to move like such an upward and downward motion.
Figure 7:
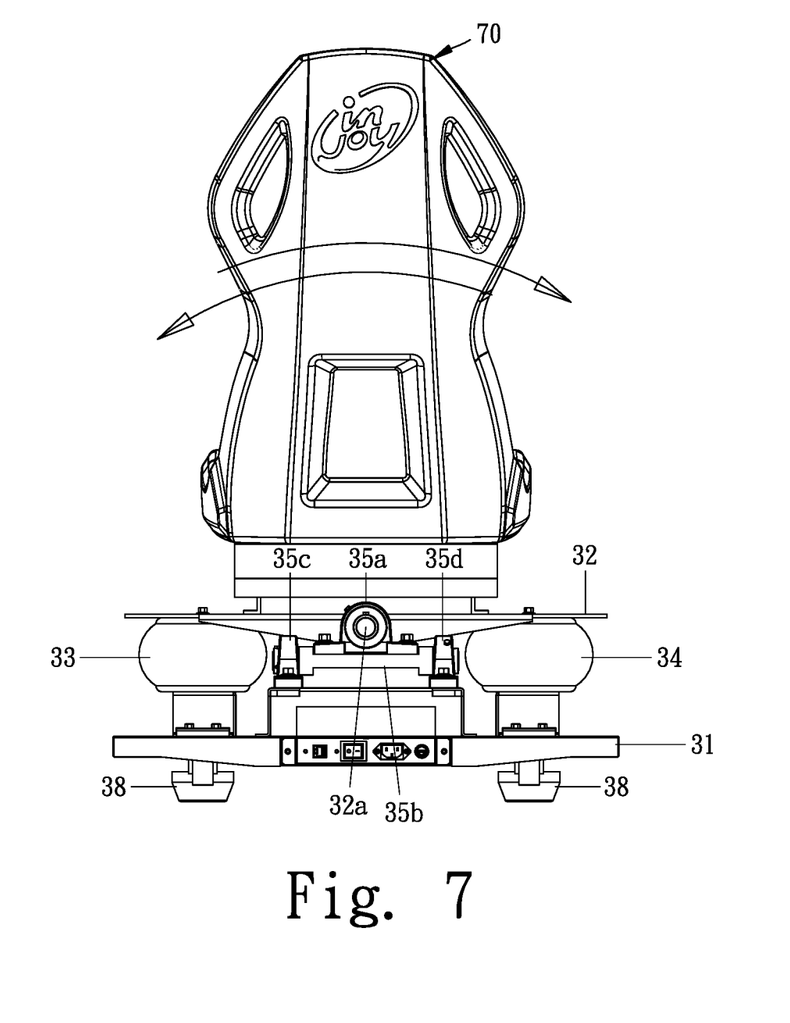
FIG. 7 is an another illustration drawing to show the 3D game console of FIG. 5 via the pneumatic driven two-axis motion platform of the present invention to control the seat due to being oscillated to and fro about the Y-axis (as shown in FIG. 5) is able to move like such a transversely shaking motion.

As shown in FIG. 3 and FIG. 4, the two-axis motion platform 30 of the present invention comprises a foundation base 31, a movable table 32, two sets of bag-shaped telescopic modules 33 and 34, and a two-way orthogonal rotator 35, wherein the movable table 32 as shown in FIG. 5 through FIG. 7 has two dimensions of rotational freedom about X-axis or/and Y-axis (hereinafter referred to as two-axis rotation).

Figure 8:
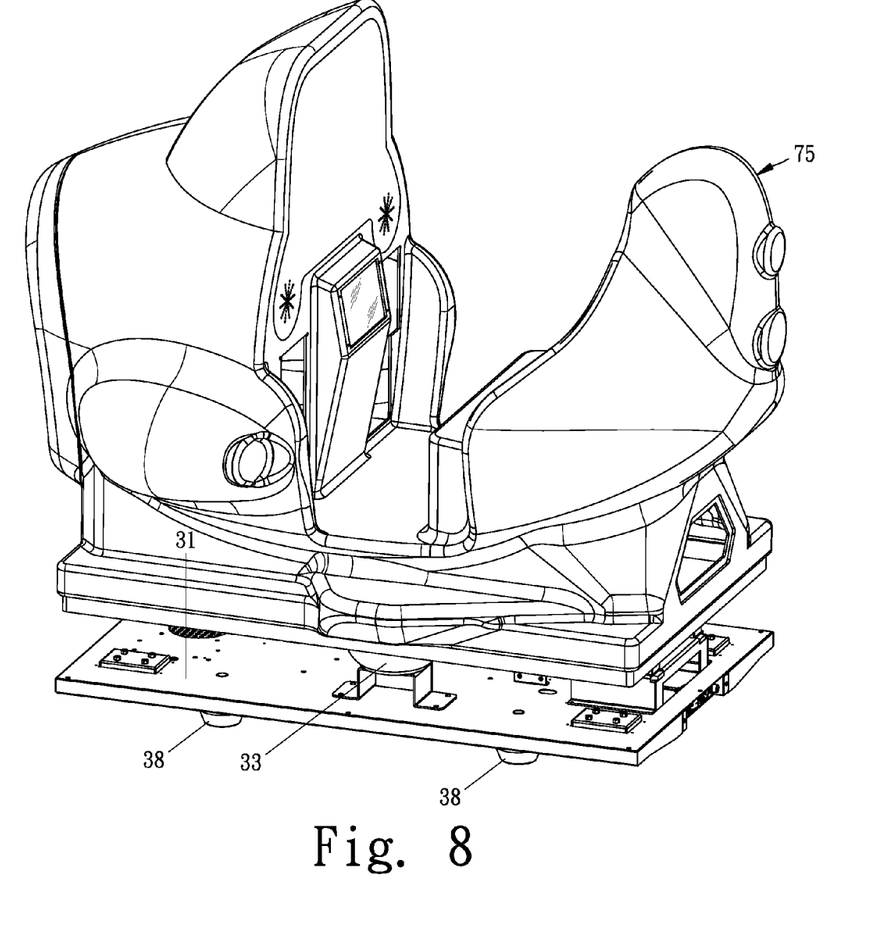
FIG. 8 is an another assembly drawing to illustrate that a cockpit is installed on the pneumatic driven two-axis motion platform of FIG. 3 to jointly form an another 3-dimensional (3D) game console.

As shown in FIG. 5 and FIG. 8, the disclosed two-axis motion platform 30 further comprises a seat 70 or a cockpit 75 that is mounted on the movable table 32.

More particularly, as shown in FIG. 3, the disclosed two-axis motion platform 30 of the present invention is such configured that the two sets of bag-shaped telescopic modules 33, 34 and the two-way orthogonal rotator 35 fixed to the foundation base 31 are arranged as an isosceles triangle arrangement, i.e., the distance between the two sets of bag-shaped telescopic modules 33, 34 forms the base of the isosceles triangle, and the distances from the two-way orthogonal rotator 35 to each sets of bag-shaped telescopic modules 33, 34 are respectively equal to form two legs of the isosceles triangle.

Figure 9:
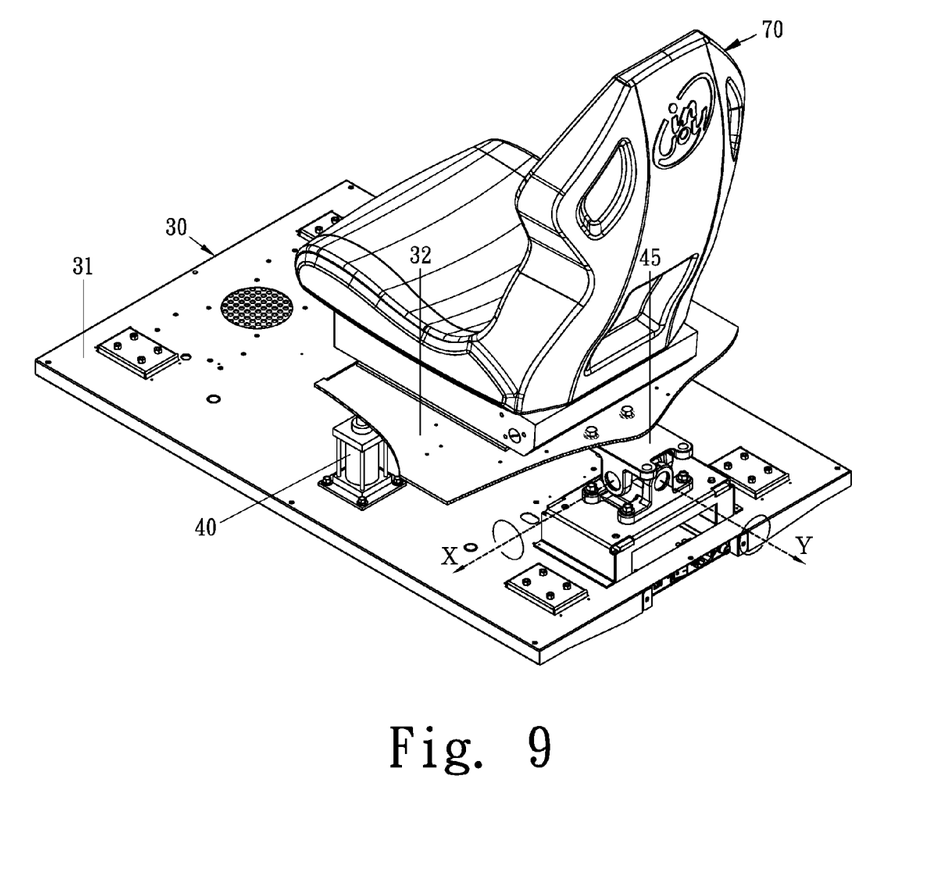
FIG. 9 is a schematic drawing of the two-axis motion platform of FIG. 5 but with the bag-shaped telescopic modules replaced by pneumatic cylinders or barometric shock absorbers, or alternately with the two-way orthogonal rotator replaced by a universal joint or a ball joint, so that the seat can be moved like an upward and downward motion or/and a transversely shaking motion.

As shown in FIG. 3 and FIG. 9, a second embodiment of the present invention teaches the two-axis motion platform 30 of the first embodiment of the present invention is allowed to use pneumatic cylinders or barometric shock absorbers 40 instead of the bag-shaped telescopic modules 33 and 34 to provide similar functions to drive the movable table 32 still having two-axis rotation about X-axis or/and Y-axis.

Alternatively, as shown in FIG. 3 and FIG. 9, another embodiment of the present invention also teaches either the two-axis motion platform 30 of the first embodiment or the second embodiment of the present invention is further allowed to use a universal joint or a ball joint 45 instead of the two-way orthogonal rotator 35 to provide similar functions to drive the movable table 32 having two-axis rotation about X-axis or/and Y-axis.

For clarity, where the words of "bag-shaped telescopic modules 33, 34" are referred in the description below, it is further intended to include, in addition to the bag-shaped telescopic modules 33, 34 themselves, the above-mentioned pneumatic cylinders or barometric shock absorbers 40 with similar functions as a substitute for the bag-shaped telescopic modules 33, 34.

As shown in FIG. 3 and FIG. 4, the foundation base 31 is a flat-like plate excellent in rigidity and strength as well as made of metal, alloy or plastic material. The foundation base 31 not only allows the bag-shaped telescopic modules 33, 34 and the two-way orthogonal rotator 35 to securely fix thereto, but also, when steadily laid on the ground, firmly and reliably supports the disclosed two-axis motion platform 30 of the present invention.

As shown in FIG. 6 through FIG. 8, for adjusting either the level or the height of the foundation base 31, at each of four bottom corners of the foundation base 31 may be respectively installed with an adjustable foot 38.

As shown in FIG. 3 and FIG. 4, the movable table 32 is a flat-like plate excellent in rigidity and strength as well as made of metal, alloy or plastic material. And, the movable table 32 has a pivotal shaft 32a used for building a pivotal connection with the two-way orthogonal rotator 35.

After completion of installation, the pivotal shaft 32a of the movable table 32 is pivotally connected to the two-way orthogonal rotator 35, and the movable table 32 is mounted on the two sets of bag-shaped telescopic modules 33, 34.

Since the two sets of bag-shaped telescopic modules 33, 34 and the two-way orthogonal rotator 35 fixed to the foundation base 31 are arranged as an isosceles triangle arrangement as shown in FIG. 3, after completely installed, the two sets of bag-shaped telescopic modules 33, 34 are symmetrical against the pivotal shaft 32a of the movable table 32.

As shown in FIG. 3 and FIG. 4, the two sets of bag-shaped telescopic modules 33, 34 are of the same modularized structure, and are such firmly fixed to the foundation base 31 that they are opposite to and spaced apart each other across the foundation base 31 and each connected to a pipeline (not shown) and an air compressor (not shown).

Each pipeline is provided with a pneumatic solenoid valve (not shown). By according to a computer-executable software program, each solenoid valve is capable of being switched to an air inlet position to carry out a procedure of air inflation for the corresponding bag-shaped telescopic modules 33, 34, or being switched to an air outlet position to carry out a procedure of air deflation for the corresponding bag-shaped telescopic modules 33, 34, or else, being switched to a closed position to stop a procedure of either air inflation or air deflation for the corresponding bag-shaped telescopic modules 33, 34.

More detailed speaking, in the process for executing air inflation, the compressed air supplied from the air compressor (not shown) is continuously introduced along the pipeline (not shown) and entered into the corresponding bag-shaped telescopic modules 33 or 34 through the air inlet position of the pneumatic solenoid valve (not shown), so that the corresponding bag-shaped telescopic module(s) 33 or/and 34 is/are become expandable phase.

Conversely, in the process for executing air deflation, the compressed air in advance entered into the corresponding bag-shaped telescopic modules 33 or 34 is continuously expelled out from the corresponding bag-shaped telescopic modules 33 or 34 through the air outlet position of the pneumatic solenoid valve (not shown), so that the corresponding bag-shaped telescopic module(s) 33 or/and 34 is/are become contractible phase. But otherwise, the corresponding bag-shaped telescopic module(s) 33 or/and 34 is/are become keeping in a permanently stationary phase when stopped for either air inflation or air deflation.

As shown in FIG. 3 through FIG. 5, the two-way orthogonal rotator 35 comprises an oscillating bearing 35a, a rotating shaft 35b, and two support bearing 35c and 35d used for building a pivotal connection with the rotating shaft 35b. During assembly, the two support bearings 35c and 35d are such fixed to the foundation base 31 that they are opposite to and spaced apart each other across the foundation base 31, and then two ends of the rotating shaft 35b are pivotally connected to the two support bearings 35c and 35d, respectively, so that the rotating shaft 35b is enabled to perform a first-axis rotation about X-axis. More particularly, the oscillating bearing 35a is such installed that it is exactly installed at the central point of the rotating shaft 35b, and is able to rotate together with the rotating shaft 35b in synchronization.

More detailed speaking, during assembly, the oscillating bearing 35a is such installed that its centerline are not only perpendicular or orthogonal to the axial line of the rotating shaft 35b, but also perpendicular or orthogonal to an imaginatively connecting line if the aforesaid two spaced apart bag-shaped telescopic modules 33, 34 are connected through each own gravity center thereof.

Finally, as shown in FIG. 5 through FIG. 9, the two-way orthogonal rotator 35 (or the universal joint 45) after assembled is fixed on the foundation base 31; the two sets of bag-shaped telescopic modules 33, 34 after assembled are fixed on the foundation base 31 and arranged with the two-way orthogonal rotator 35 (or the universal joint 45) as an isosceles triangle as well as combined with the movable table 32; and the pivotal shaft 32a of the movable table 32 after assembled is built a pivotal connection with the oscillating bearing 35a of the two-way orthogonal rotator 35.

As shown in FIG. 5 and FIG. 6, by operating the pneumatic solenoid valve (not shown) to synchronously inflate and deflate the two sets of bag-shaped telescopic modules 33 and 34, the movable table 32 is capable of performing an tilting rotation about the rotating shaft 35b via the two support bearing 35c and 35d of the two-way orthogonal rotator 35 to provide with a first-axis rotation about X-axis.

As shown in FIG. 5 and FIG. 7, by operating the pneumatic solenoid valve (not shown) to repeatedly inflate and deflate one set of the two sets of bag-shaped telescopic modules 33 or 34, the movable table 32 is capable of performing an oscillating rotation about its own pivotal shaft 32a via the oscillating bearing 35a of the two-way orthogonal rotator 35 to provide with a second-axis rotation about Y-axis.

For example, as shown in FIG. 6 through FIG. 8, by synchronously inflating or deflating the two sets of bag-shaped telescopic modules 33 and 34, the seat 70 (or cockpit 75) is tilted forward and backward against the rotation shaft 35b of the two-way orthogonal rotator 35 and then felt like an upward and downward motion. Or else, by alternately inflating or deflating one set of the two sets of bag-shaped telescopic modules 33 or 34, the seat 70 (or cockpit 75) is oscillated to and fro against the pivotal shaft 32a of the movable table 32 and then felt like a shaking motion.

What is claimed is:

1. A pneumatic driven two-axis motion platform having two dimensions of rotational freedom, comprising:
   a foundation base steadily laid on the ground;
   a movable table having a pivotal shaft;
   two sets of bag-shaped telescopic modules, spaced apart each other and fixed to the foundation base as well as combined with the movable table through such an arrangement that they are symmetrical against the pivotal shaft of the movable table; and each set of bag-shaped telescopic module capable of being either become an expandable phase due to air deflation or become a contractible phase due to air deflation or else become a permanently stationary phase when stopped for either air inflation or air deflation; and
   a two-way orthogonal rotator arranged together with the two sets of bag-shaped telescopic modules as an isosceles triangle arrangement, including
      two separated support bearings, being fixed to the foundation base;

a rotating shaft, having two ends and each end pivotally connected to the corresponding support bearing respectively, and an oscillating bearing, fixed at a central point of the rotating shaft and pivotally connected to the pivotal shaft of the movable table.

2. The pneumatic driven two-axis motion platform of claim 1, wherein the two-way orthogonal rotator is replaced by a universal joint or a ball joint that is functionally similar thereto.

3. The pneumatic driven two-axis motion platform of claim 2, wherein an adjustable foot is provided at each of four bottom corners of the foundation base.

4. The pneumatic driven two-axis motion platform of claim 2, further comprising a seat or a cockpit that is mounted on the movable table.

5. The pneumatic driven two-axis motion platform of claim 1, wherein the bag-shaped telescopic module is replaced by a pneumatic cylinder or a barometric shock absorber that is functionally similar thereto.

6. The pneumatic driven two-axis motion platform of claim 5, wherein an adjustable foot is provided at each of four bottom corners of the foundation base.

7. The pneumatic driven two-axis motion platform of claim 5, further comprising a seat or a cockpit that is mounted on the movable table.

8. The pneumatic driven two-axis motion platform of claim 1, wherein an adjustable foot is provided at each of four bottom corners of the foundation base.

9. The pneumatic driven two-axis motion platform of claim 1, further comprising a seat or a cockpit that is mounted on the movable table.

* * * * *